United States Patent
Bashoura et al.

(10) Patent No.: US 6,639,974 B2
(45) Date of Patent: *Oct. 28, 2003

(54) FAX ROUTING SYSTEM AND METHOD USING STANDARD FAX MACHINE AND PERSONAL COMPUTER

(75) Inventors: Joseph Elias Bashoura, San Dimas, CA (US); Charles J. Coudsi, Foster City, CA (US); Peter Victor Derycz, Los Angeles, CA (US); Fady Joseph Garabet, La Verne, CA (US)

(73) Assignee: Infotrieve, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/234,396

(22) Filed: Apr. 29, 2002

(65) Prior Publication Data

US 2003/0026400 A1 Feb. 6, 2003

Related U.S. Application Data

(63) Continuation of application No. 09/538,890, filed on Mar. 30, 2000, now Pat. No. 6,381,313, which is a continuation of application No. 09/148,640, filed on Sep. 4, 1998, now Pat. No. 6,052,445, which is a continuation of application No. 08/833,851, filed on Apr. 10, 1997, now Pat. No. 5,862,202.

(51) Int. Cl.$^7$ ............................................. H04M 11/00
(52) U.S. Cl. ........................... 379/100.14; 379/100.09; 379/130; 358/407; 358/440; 370/352
(58) Field of Search .......... 379/100.01, 100.03–100.06, 379/100.08, 100.09, 100.12, 100.14, 100.15, 100.17, 93.05–93.07, 130; 358/400, 402, 407, 434–441, 468; 370/352, 389

(56) References Cited

U.S. PATENT DOCUMENTS

| 3,558,811 A | 1/1971 | Montevecchio et al. |
| 4,654,718 A | 3/1987 | Sueyoshi |

(List continued on next page.)

FOREIGN PATENT DOCUMENTS

| JP | 07-131564 | 5/1995 |
| WO | WO 97/10668 | 3/1997 |
| WO | WO 97/18665 | 5/1997 |

*Primary Examiner*—Wing Chan
(74) *Attorney, Agent, or Firm*—McDermott, Will & Emery

(57) ABSTRACT

A fax routing system and method using a standard fax machine and personal computer. The telephone number is decoded from the telephone number dialing which is generated by the fax machine. This number is looked up in a table. If a corresponding Internet-address is found, the fax is downloaded from the fax machine, converted into a computer file, and sent to the recipient via his Internet address. If a corresponding Internet address is not found, the decoded number is dialed on a telephone line and, thereafter, the telephone line is connected to the fax machine for normal fax delivery.

5 Claims, 3 Drawing Sheets

U.S. PATENT DOCUMENTS

| | | |
|---|---|---|
| 4,941,170 A | 7/1990 | Herbst |
| 4,961,185 A | 10/1990 | Sawada |
| 4,994,926 A | 2/1991 | Gordon et al. |
| 5,014,300 A | 5/1991 | Harvath et al. |
| 5,091,790 A | 2/1992 | Silverberg |
| 5,127,048 A | 6/1992 | Press et al. |
| 5,204,757 A | 4/1993 | Agudelo et al. |
| 5,204,895 A | 4/1993 | Yoshiura |
| 5,206,743 A | 4/1993 | Hochman et al. |
| 5,287,199 A | 2/1994 | Zoccolillo |
| 5,308,058 A | 5/1994 | Mandel et al. |
| 5,369,686 A | 11/1994 | Dutra et al. |
| 5,400,335 A | 3/1995 | Yamada |
| 5,406,557 A | 4/1995 | Baudoin |
| 5,452,106 A | 9/1995 | Perkins |
| 5,479,411 A | 12/1995 | Klein |
| 5,513,126 A | 4/1996 | Harkins et al. |
| 5,521,719 A | 5/1996 | Yamada |
| 5,550,906 A | 8/1996 | Chau et al. |
| 5,579,126 A * | 11/1996 | Otsuka .................. 358/403 |
| 5,754,640 A | 5/1998 | Sosnowski |
| 5,862,202 A * | 1/1999 | Bashoura et al. ...... 379/100.14 |
| 5,905,782 A | 5/1999 | Lee et al. |
| 5,949,859 A | 9/1999 | O'Toole |
| 6,052,445 A * | 4/2000 | Bashoura et al. ...... 379/100.14 |
| 6,310,942 B1 | 10/2001 | Bashoura et al. |
| 6,381,313 B1 * | 4/2002 | Bashoura et al. ...... 379/100.14 |

* cited by examiner

FAX ROUTING SYSTEM AND METHOD USING STANDARD FAX MACHINE AND PERSONAL COMPUTER

This is a continuation of U.S. patent application Ser. No. 09/538,890, filed Mar. 30, 2000 (now U.S. Pat. No. 6,381, 313 B1), which was a continuation of application Ser. No. 09/148,640, filed on Sep. 4, 1998 (now U.S. Pat. No. 6,052,445), which was a continuation of application Ser. No. 08/833,851, filed on Apr. 10, 1997 (now U.S. Pat. No. 5,862,202).

BACKGROUND OF THE INVENTION

1. Field of the Invention

This invention relates to fax routing systems and methods and, in particular, fax routing systems and methods which direct faxes over the most economical route.

2. Description of Related Art

The delivery of faxes is very important to modern-day business. The cost of toll calls, however, lessens the value of this important technology.

Toll-free telephone numbers have been created to partially alleviate this problem. Unfortunately, these telephone numbers are expensive and not in widespread use.

The Internet is another technology which is being used to advantageously carry faxes. Its widespread use, however, has been hampered by the need for special equipment (e.g., document readers) and the failure of many business to have the equipment which is necessary to receive a fax over the Internet.

SUMMARY OF THE INVENTION

One object of the present invention is to provide a fax routing system and method which obviates these and other problems in the prior art.

Another object of the present invention is to provide a fax routing system and method which routes a fax over the most economical route.

A still further object of the present invention is to provide a fax routing system and method which chooses the most economical route for the fax automatically.

A still further object of the present invention is to provide a fax routing system and method which does not require a special document scanner to read the fax, but can instead utilize a standard fax machine.

A still further object of the present invention is to provide a fax routing system and method which does not require a substantial investment in specialized computer equipment but, instead, can utilize an existing personal computer ("PC").

A still further object of the present invention is to provide a fax routing system and method which economically routes faxes using a minimum of equipment in addition to what is already possessed by the typical business.

A still further object of the present invention is to provide a fax routing system and method for routing faxes over the most economical route which is easy to operate.

These as well as still further objects, features and benefits of the present invention are provided by a fax routing system and method which is adaptable to using a standard fax machine and PC to identify the most economical route for the fax and to direct the fax over that route. The system and method includes a fax director connected to the fax machine, to the PC, to a telephone line, and, optionally, to the Internet.

Transmission of the fax begins in the normal manner by placing the fax to be sent in the standard fax machine. The fax director provides the standard fax machine with a dial tone and then receives and decodes the number which is dialed by the standard fax machine. This number is then routed to the PC, which looks it up in a table.

If the number is in the table, a corresponding Internet address is returned. The fax director then handshakes with the standard fax machine. The fax director then receives the fax being sent by the standard fax machine and converts it into a computer file. That computer file is then sent to the Internet address. The Internet address can be a standard IP address or an E-mail address.

If the number is not in the table, the fax director dials the telephone number over the telephone line and then connects the standard fax machine to the telephone line so that the fax can be sent in its normal manner.

These, as well as still further objects, features and benefits of the present invention will now become clear upon an examination of the accompanying drawings and detailed description of the preferred embodiments.

DETAILED DESCRIPTION OF THE PREFERRED EMBODIMENTS

Figure 1:
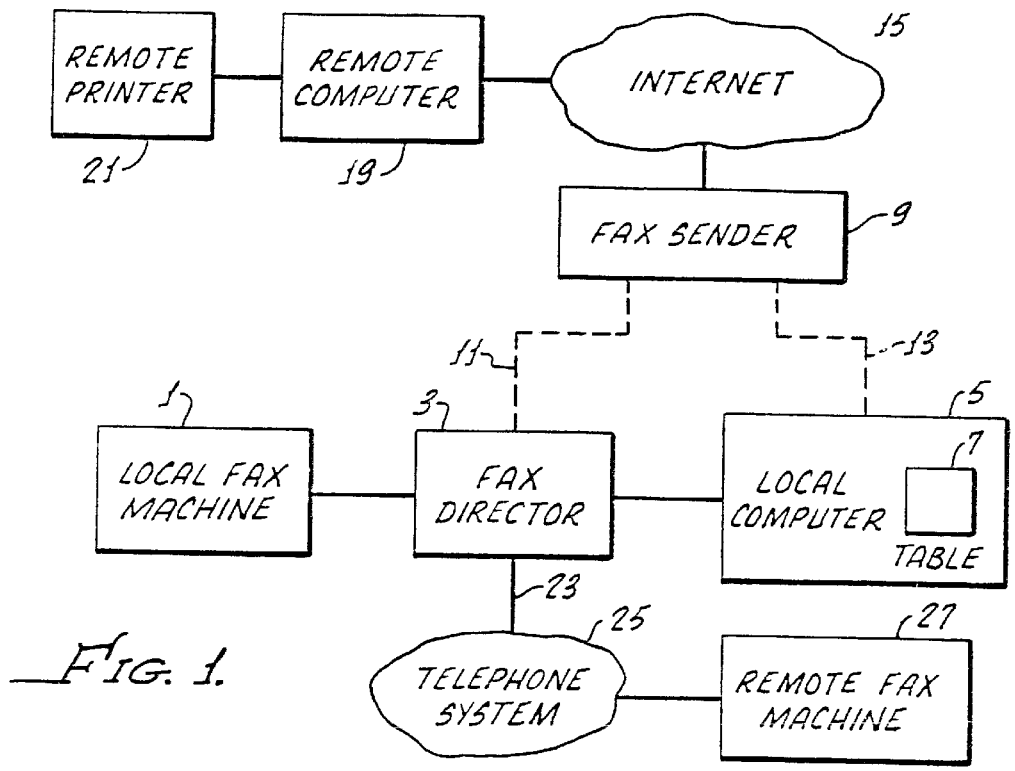
FIG. 1 is a block diagram of a fax routing system and method configured in accordance with one embodiment of the present invention.

FIG. 1 is a block diagram of a fax routing system and method configured in accordance with one embodiment of the present invention.

As shown in FIG. 1, a local fax machine 1 is connected to a fax director 3. The fax director 3 is connected to a local computer 5 containing a table 7.

The system shown in FIG. 1 also includes a fax sender 9. The line 11 connecting the fax sender 9 to the fax director 3 and the line 13 connecting the fax sender 9 to the local computer 5 are shown as dotted. This has been done to indicate that, at least in the embodiment shown in FIG. 1, only one of the connections is actually needed.

The system shown in FIG. 1 also includes a connection between the fax sender 9 and the Internet 15. FIG. 1 also shows an example of the many other types of connections to the Internet 15 which can advantageously be utilized in connection with the subject invention, such as a remote computer 19 connected to a remote printer 21. Last, FIG. 1 shows the fax director 13 also being connected over a telephone line 23 to the telephone system 25 which, in turn, is connected to a variety of devices which can advantageously be used in connection with the subject invention, such as a remote fax machine 27.

Figure 2:
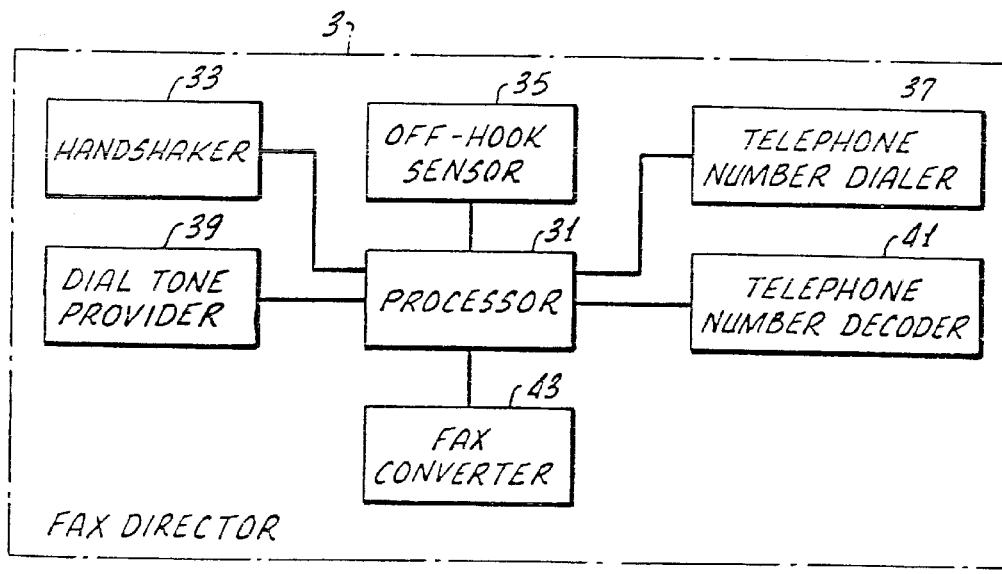
FIG. 2 is a block diagram of one embodiment of the fax director shown in FIG. 1.

FIG. 2 is a block diagram of one embodiment of the fax director 3 shown in FIG. 1. As shown in FIG. 2, the fax director 3 includes a processor 31 connected to a handshaker 33, an off-hook sensor 35, a telephone number dialer 37, a dial tone provider 39, a telephone number decoder 41, and a fax converter 43.

Figures 3, 4:
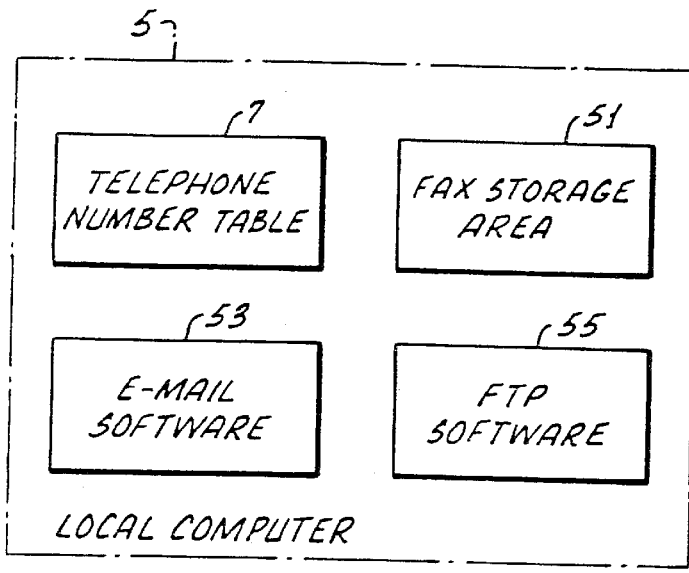
FIG. 3 is a block diagram of one embodiment of the local computer shown in FIG. 1.
FIG. 4 is a block diagram of one embodiment of the table shown in FIG. 1.

FIG. 3 is a block diagram of the local computer 5 shown in FIG. 1. As shown in FIG. 3, the local computer 5 includes the telephone number table 7, a fax storage area 51, E-mail software 53, and FTP software 55.

FIG. 4 is a block diagram of one embodiment of the table 7 shown in FIGS. 1 and 3. As shown in FIG. 4, the table 7 includes a set of records 61, each of which includes a telephone number 63, and a corresponding IP address 65 and/or a corresponding E-mail address 67.

Figure 5:
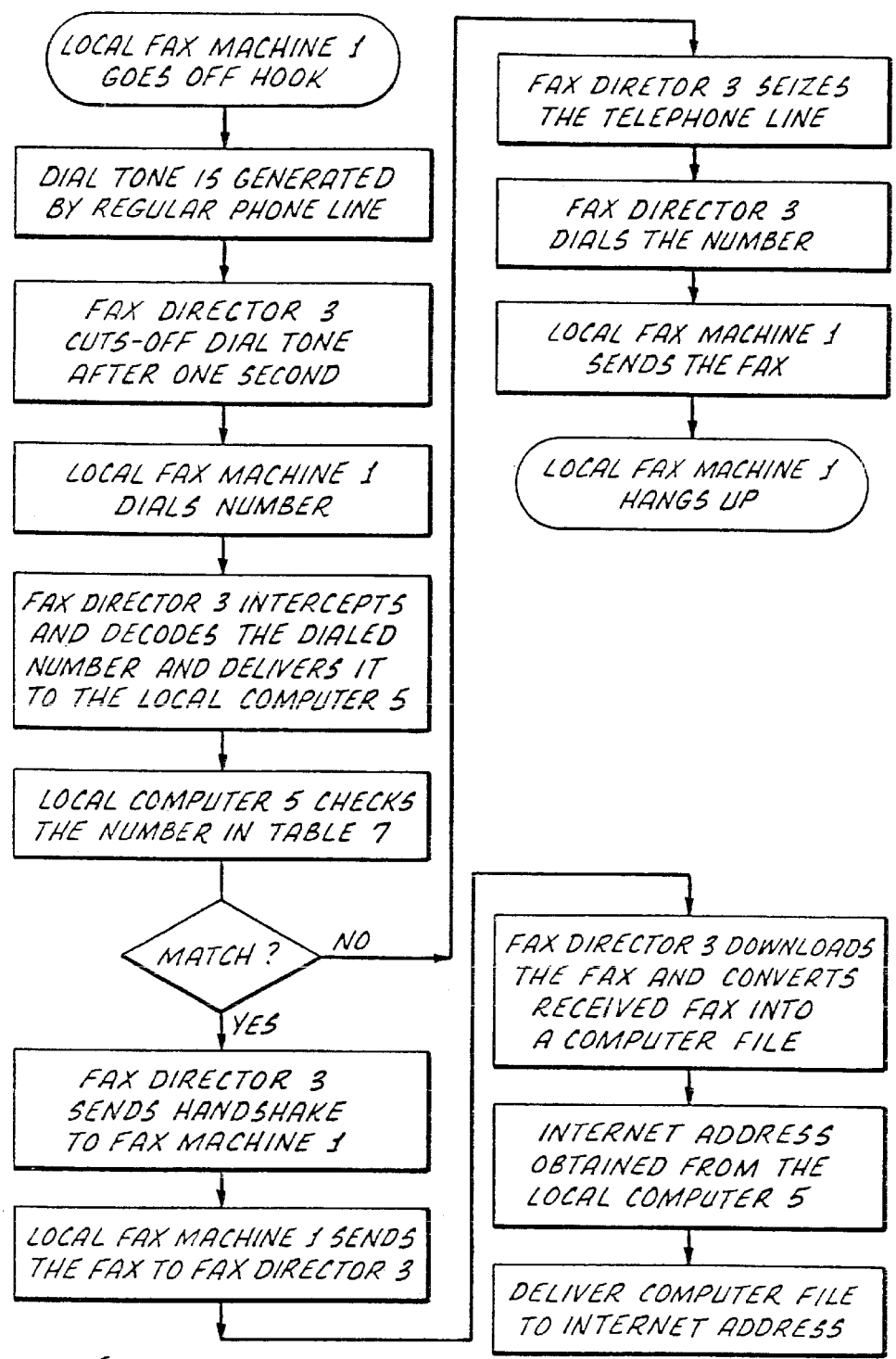
FIG. 5 is a flow diagram illustrating one of the operational sequences of the embodiment of the present invention shown in FIGS. 1–4.

FIG. 5 is a flow diagram illustrating one of the operational sequences of the embodiment of the present invention shown in FIGS. 1–4.

The operation of the components shown in FIGS. 1–4 and the many variations which they can take are best understood by considering FIGS. 1–4 in conjunction with FIG. 5, along with the explanation which now follows.

The local fax machine 1 can be any type of fax machine. In a preferred embodiment, the local fax machine 1 is a standard fax machine, i.e., a machine which receives the information to be faxed and the telephone number to which it is to be faxed, dials the telephone number, handshakes with the receiving fax machine, and then delivers the fax over the telephone.

After the fax to be sent and the telephone number is presented to the local fax machine 1, the local fax machine 1 typically seizes the telephone line by going "off-hook." This usually causes a dial tone to be generated.

Most local fax machines (but not all) test for the presence of the dial tone before proceeding. Once this tone is detected, the local fax machine then dials the number to which the fax is to be sent.

In the configuration of the present invention shown in FIG. 1, however, the local fax machine 1 is not directly connected to a telephone line. Instead, it is connected to the fax director 3.

As illustrated in FIG. 2, the fax director 3 includes the off-hook sensor 35. This is a device which senses that the local fax machine 1 has gone "off-hook." Typically, this device accomplishes this function by sensing a low impedance state on the line connected to the local fax machine 1.

Upon detecting an "off-hook" condition, the "off-hook" sensor 35 signals the processor 31 in the fax director 3 to provide a dial tone. In turn, the processor 31 directs the dial tone provider 39 to provide a dial tone and to deliver that dial tone to the local fax machine 1.

Generation of the dial tone by the dial tone provider 39 can be accomplished using a broad variety of well-known techniques. One technique is simply to internally generate the tones needed to simulate a dial tone with audio oscillators. In a preferred embodiment, however, the dial tone provider 39 generates the needed dial tone by seizing the telephone line 23 and simply directing the dial tone which the telephone line 23 generates to the local fax machine 1, all under the control of the processor 31.

If the local fax machine 1 does not require a dial tone to trigger its dialing, of course, the fax director need not contain the dial tone provider 39. In the typical situation where such a dial tone is required, the dial tone provider 39 typically cuts off the dial tone after approximately one second.

Upon receiving the dial tone (or after seizing the line if no dial tone is required), the local fax machine 1 then dials the number to be dialed. It does so using well-known dialing techniques, such as the generation of touch tones or dial pulses.

Instead of being received by a telephone line, however, the dialing from the local fax machine 1 is received by the fax director 3 and decoded by the telephone number decoder 41 under the control of the processor 31, both contained with the fax director 3.

The decoded telephone number is then delivered under the control of the processor 31 to the local computer 5.

Within the local computer 5 is the table 7. As best illustrated in FIG. 4, the table 7 is simply a data structure containing a plurality of records 61, each one of which includes a telephone number 63 and a corresponding Internet address, such as an IP address 65 or an E-mail address 67.

The telephone number table 7 in the local computer 5 is easily generated and maintained using well-known programming techniques. When it is known that a potential fax recipient has the ability to receive a fax over the Internet, the recipient's telephone number and his receiving Internet address is stored in the table 7.

In practice, there are many methods by which a fax can actually be sent over the Internet. If the recipient has an IP address, the fax can be sent directly to that IP address using file transfer protocol ("FTP"). In this case, the IP address would be stored in association with the telephone number at the appropriate location in the telephone table 7.

Many users of the Internet, however, do not have their own IP address. Instead, they connect to the Internet through servers maintained by others, such as Independent Servers Providers ("ISPs"). These temporary users of the Internet typically have an E-mail address. For those Internet users who do not have their own IP address, their E-mail address can also be stored in the table 7, as illustrated in FIG. 4.

Some Internet users, of course, will have both an IP address and an E-mail address. In this case, both addresses can be stored in the table 7 or, at the option of the user, one or the other. Some users may opt to store only the IP address in those cases in which both are available.

Upon receiving the telephone number to which the fax should be sent from the fax director 3, the local computer 5 looks up that telephone number in the table 7. Again, this is done using well-known programming techniques.

If the dialed telephone number appears in the table, notice of this appearance is sent by the local computer 7 to the fax director 3. Upon receipt, the processor 31 causes the handshaker 33 to issue the necessary communication signals to the local fax machine 1 so that the fax director 3 and the local fax machine 1 can "handshake." This is a process which is well known in the art for establishing a common protocol for the delivery of the fax.

Following this handshaking, the local fax machine 1 delivers the fax using standard and well known fax transmission techniques to the fax director 3. This fax is received by the fax converter 43 in the fax director 3 which converts the received fax into a computer file. This, again, is done using well-known techniques, techniques which are presently in widespread use in fax-modem boards.

The computer file is then delivered to the local computer 5 and stored in the fax storage area 51. As is well known in the art, such an area can be RAM, a hard disk, or any other type of storage device.

The Internet address corresponding to the telephone number is then obtained from the table 7 in the computer 5.

If the Internet address is an IP address, the FTP software 55 in the local computer 5 generates the necessary signals for causing that file to be delivered into the Internet using FTP protocol. This can be done by directly controlling the fax sender 9 through the connection 13. Alternatively, these control and data signals can be sent back to the fax director 3 from the local computer 5 which, in turn, can control the fax sender 9 through a connection 11.

If only a corresponding E-mail address is stored in the table 7, the E-mail software 53 in the local computer 5 generates an E-mail message to the recipient (or no message at all) and delivers that E-mail into the fax sender 9 for delivery into the Internet 15 with the computer file attached. Again, the local computer 5 can instead deliver the E-mail with the computer file attached to the fax director 3 which, in turn, delivers it over the line 11 to the fax sender 9.

The fax sender 9 can be implemented using any of a broad variety of technologies. It could be as simple as a modem board plugged into the local computer 5 or the fax director 11. This board, in turn, could be given a telephone line or an ISDN line which would connect to the Internet in one of many well-known ways, such as through an ISP. The fax sender 9 could also be a modem server contained on a network system. It could also be a more direct link to the Internet, such as a T1 line. All types of connections to the Internet 15 are contemplated.

Following receipt of the computer file by the Internet, the computer file proceeds in accordance with well-established techniques. Typically, it will be received by a remote computer, such as the remote computer 19, which will strip the fax from the transmission and deliver it for viewing to a screen or, for more permanent display, to a remote printer, such as the remote printer 21. A broad variety of other existing technologies, of course, can also be used advantageously to receive this transmission.

In the event that the telephone number is not contained within the table 7, a different course of action is followed. First, the fax director 43 seizes the telephone line 23 and dials the telephone number using the telephone number dialer 37 under the control of the processor 31. After the number is dialed by the fax director 3, the telephone line 23 is connected to the local fax machine 1.

The local fax machine 1 then proceeds to deliver its fax into the telephone system 25 in accordance with existing techniques. It handshakes with the remote fax machine 27 and, thereafter, delivers the fax. The local fax machine 1 then hangs up, causing the system to re-set itself for the next fax. For this function to work, the entire operation of looking the telephone number up in the table, signaling the absence of the number, and dialing the number over the telephone line, must all usually occur sufficiently quickly to avoid a time-out of the local fax machine 1.

The embodiments of the present invention which have now been described are merely illustrative. Numerous variations are contemplated. For example, the exact location of many of the modules could be different. The fax sender 9 could be a component of the fax director 3 or could be a component of the local computer 5. The fax director 3 could even be a board which is plugged into the local computer 5. Although an existing PC is contemplated as the device which performs the functions of the local computer 5, the fax director 3 could be custom-designed to perform these functions itself.

Although the Internet address look-up function has thus been described as occurring after the downloading of the fax from the local fax machine 1, it is to be understood that this operation could occur before that downloading, if desired. Indeed, it could occur at the very moment the telephone number is first looked up in the table 7. In this case, the corresponding address could simply be stored in a buffer until later needed.

Although one structure for the table 7 has been shown in FIG. 4, moreover, it is to be understood that many other structures could instead be used. For example, a one field could contain either the IP address or the E-mail address and another field could contain a flag indicating which type of address is stored in the first field. It is also contemplated that the active commands to the local computers and/or the fax sender 9 could be merged into the fax director 3, making the local fax machine 1 and the fax director 3 the only necessary components at the sending location. Numerous other configurations could also be used, as is well-known in the art.

In short, the present invention contemplates a broad variety of configurations, embodiments, features and benefits, and is limited solely by the claims which follow.

We claim:

1. A system co-located with a sender of a fax for directing a fax over the Internet to a desired recipient at an Internet address, the desired recipient being identified to the system by an identification code that is not the Internet address, comprising:
   a. a storage system co-located with the sender of the fax for storing a plurality of records in a table, each record containing:
      (1) an identification code identifying a recipient that can receive a fax at an Internet address that is not the identification code; and
      (2) the Internet address;
   b. a processing system co-located with the sender of the fax in communication with said storage system configured to:
      (1) receive the identification code;
      (2) determine whether said storage system contains a matching record having the identification code; and
      (3) direct the fax to the Internet address in the matching record if said storage system contains a matching record.

2. The system of claim 1 wherein the identification code is manually entered by the sender of the fax.

3. A system co-located with a sender of a fax for directing a fax over a network to a desired recipient at a network address, the desired recipient being identified to the system by an identification code that is not the network address, comprising:
   a. a storage system co-located with the sender of the fax for storing a plurality of records in a table, each record containing:
      (1) an identification code identifying a recipient that can receive a fax at a network address that is not the identification code; and
      (2) the network address;
   b. a processing system co-located with the sender of the fax in communication with said storage system configured to:
      (1) receive the identification code;
      (2) determine whether said storage system contains a matching record having the identification code; and
      (3) direct the fax to the network address in the matching record if said storage system contains a matching record.

4. A system under the management of a sender of a fax for directing a fax over the Internet to a desired recipient at an Internet address, the desired recipient being identified to the system by an identification code that is not the Internet address, comprising:
   a. a storage system under the management of the sender of the fax for storing a plurality of records in a table, each record containing:
      (1) an identification code identifying a recipient that can receive a fax at an Internet address that is not the identification code; and
      (2) the Internet address;
   b. a processing system under the management of the sender of the fax in communication with said storage system configured to:
      (1) receive the identification code;
      (2) determine whether said storage system contains a matching record having the identification code; and
      (3) direct the fax to the Internet address in the matching record if said storage system contains a matching record.

5. The system of claim 4 wherein said storage system and said processing system are co-located with the sender.

* * * * *